(12) United States Patent
Dyer et al.

(10) Patent No.: US 12,465,689 B2
(45) Date of Patent: Nov. 11, 2025

(54) ENCODING INFORMATION FOR DRUG DELIVERY

(71) Applicant: Portal Instruments, Inc., Cambridge, MA (US)

(72) Inventors: Robert J. Dyer, Cambridge, MA (US); Andrew Coats, Cambridge, MA (US)

(73) Assignee: Portal Instruments, Inc., Cambridge, MA (US)

( * ) Notice: Subject to any disclaimer, the term of this patent is extended or adjusted under 35 U.S.C. 154(b) by 529 days.

(21) Appl. No.: 15/801,701

(22) Filed: Nov. 2, 2017

(65) Prior Publication Data

US 2018/0117252 A1    May 3, 2018

Related U.S. Application Data

(60) Provisional application No. 62/416,412, filed on Nov. 2, 2016.

(51) Int. Cl.
*A61M 5/30* (2006.01)
*A61M 5/20* (2006.01)
*G16H 20/17* (2018.01)

(52) U.S. Cl.
CPC ............... *A61M 5/30* (2013.01); *A61M 5/20* (2013.01); *G16H 20/17* (2018.01);
(Continued)

(58) Field of Classification Search
CPC .............. A61M 5/172; A61M 5/16804; A61M 5/16877; A61M 2205/3306; A61M 2205/50; A61M 2205/6072; A61M 2205/6063; A61M 2205/6018; A61M 5/30; A61M 5/24; A61M 5/2422; A61M 5/2425; A61M 5/2429; A61M 5/2488; A61M 5/2455; A61M 2005/2403; A61M 2005/2418; A61M 2005/2433; A61M 2005/2477; A61M 2005/2481;
(Continued)

(56) References Cited

U.S. PATENT DOCUMENTS 4,978,335 A * 12/1990 Arthur, III .......... A61M 5/1456
604/67
6,743,202 B2 * 6/2004 Hirschman ....... A61M 5/14546
604/131
(Continued)

FOREIGN PATENT DOCUMENTS

WO    2013082423 A1    6/2013

*Primary Examiner* — Kevin C Sirmons
*Assistant Examiner* — Leah J Swanson
(74) *Attorney, Agent, or Firm* — Strategic Patents, P.C.

(57) ABSTRACT

An approach to providing predictable and uniform drug delivery across many instances of an automated drug delivery procedure involves measuring features of the drug delivery system prior to delivery. An automated drug delivery procedure is configured to compensate for or otherwise accommodate the impact of these features based on the
(Continued)

measured features. In some examples, the measured features are encoded by value or by reference to an external database onto the drug containing component, for example, by affixing a tag (e.g., RFID, barcode, etc.) to the component. At the time of drug delivery, the features are accessed, for example using the affixed tag, and the drug delivery procedure is controlled according to the features.

12 Claims, 8 Drawing Sheets

(52) U.S. Cl.
CPC ............ *A61M 2205/3306* (2013.01); *A61M 2205/332* (2013.01); *A61M 2205/50* (2013.01); *A61M 2205/6054* (2013.01); *A61M 2205/6072* (2013.01)

(58) Field of Classification Search
CPC .. A61M 2005/2485; A61M 2005/2488; A61M 2005/2495; A61M 2005/2496; A61M 5/28; A61M 5/281–286; A61M 5/288; A61M 2005/287; A61M 2205/60; A61M 2205/6054; A61M 5/20; A61M 2205/332; A61M 2005/2437; A61M 2005/244; A61M 2005/2444; A61M 2005/2451; A61M 2005/2462; A61M 2005/247; A61M 2005/2474; G16H 20/17
See application file for complete search history.

(56) References Cited

U.S. PATENT DOCUMENTS

| | | | |
|---|---|---|---|
| 2003/0072676 A1* | 4/2003 | Fletcher-Haynes | A61M 1/3681 422/23 |
| 2003/0074223 A1* | 4/2003 | Hickle | A61J 1/14 705/2 |
| 2003/0233070 A1* | 12/2003 | De La Serna | A61K 9/0004 604/141 |
| 2005/0197650 A1* | 9/2005 | Sugimoto | A61M 5/31541 604/890.1 |
| 2008/0015506 A1* | 1/2008 | Davis | A61M 5/16831 604/151 |
| 2009/0198208 A1* | 8/2009 | Stavsky | B65B 3/003 604/407 |
| 2010/0004621 A1* | 1/2010 | Toles | A61M 5/30 604/500 |
| 2012/0089114 A1* | 4/2012 | Hemond | A61M 5/46 604/500 |
| 2014/0148708 A1* | 5/2014 | Cosentino | A61B 5/445 600/476 |
| 2015/0051573 A1* | 2/2015 | Tieck | A61M 5/14248 604/500 |
| 2015/0211950 A1* | 7/2015 | Eckhoff | B65B 7/2821 702/50 |
| 2017/0056604 A1* | 3/2017 | Cowan | G01F 23/02 |
| 2017/0319790 A1* | 11/2017 | Andersen | A61M 5/31561 |
| 2019/0022331 A1* | 1/2019 | Larsen | A61M 5/20 |

* cited by examiner

ENCODING INFORMATION FOR DRUG DELIVERY

This application claims priority to, and the benefit of, Provisional Application Ser. No. 62/416,412, filed Nov. 2, 2016, the contents of which are hereby entirely incorporated herein by reference.

BACKGROUND

This invention relates to encoding information for drug delivery, and more particularly, encoding information related to characteristics of a component of a drug delivery system for controlling delivery of the drug.

One approach to drug delivery makes use of an injector such as a needle-free injection system. The injector generally includes an injection mechanism, which in some versions may be reusable, and a drug containing component, for example, a glass or metal cartridge that holds the drug to be injected. It may be desirable to operate the injection mechanism for an accurate injection process according to, e.g., velocity of delivery as a function of time. In some cases, these characteristics may depend on factors such as the drug being delivered. In other cases, characteristics of some or all of the components of the injector may affect the drug delivery function. There remains a need for more accurate control of an injection process.

SUMMARY

A drug delivery procedure can yield improved accuracy by measuring and compensating for various characteristics of an injector system. Measured features may be encoded in any suitable form and stored with the injector by affixing a tag (e.g., RFID, barcode, etc.) or the like to the measured component. At the time of drug delivery, the measurement(s) may be accessed, for example using the affixed tag, and the drug delivery procedure may be adjusted based on the measured values. This approach advantageously facilitates improved injection accuracy independently from manufacturing tolerances.

In some examples of automated needle-free injection, features of a drug cartridge before and/or after filling with the drug are measured prior to injection. For example, these measurements are made in a manufacturing phase that produces filled cartridges for distribution. Examples of measured features include a diameter and/or area of a nozzle orifice through which the drug will be delivered, a bore diameter of the cartridge, and an amount of air contained with the drug in the cartridge the size of the air bubble in the cartridge).

In some examples of needle-free injection, the drug delivery procedure forces the drug in the cartridge through the orifice by applying a force, for example, via a plunger, to yield a target velocity profile over time. For example, it may be desired to achieve a high velocity during an initial period to "pierce" the skin, and then to achieve a relatively lower velocity after the initial period, to deliver the remainder of the dose. The size of an air bubble and/or the nozzle size may affect the desired initial force profile to yield the initial high velocity. For example, the air bubble may initially compress before the drug reaches a high velocity, and the force applied to the plunger may be controlled in an open-loop manner according to the size of the air bubble. Similarly, the size of the orifice affects the drug velocity for a particular plunger force. Therefore, the injection mechanism adjusts the plunger force according to the orifice size to yield the desired drug velocity.

In some examples, the drug cartridge includes a machine-readable tag, for instance an RFID or printed barcode, that is read by a delivery device to obtain parameters that characterize the cartridge, and that are used to configure a controller that causes a particular force or velocity to be applied to a plunger to yield a desired resulting velocity or force of the delivered drug.

In some examples, the tag includes further information, for instance the identity of the drug, a patient's name, or other authentication information that authorizes injection of the drug. The controller of the injection device may further use this information to determine whether or how to control the injection and/or to interact with information systems that authorize or log the drug delivery by the device.

In some examples, the tag itself encodes the information that is used to control the drug delivery process. In other examples, the tag includes a reference to external data storage, for instance at a remote computer server, from which the information is retrieved.

In one aspect, in general, a method for medical delivery uses instances of a component that exhibits variation among the instances. For each instance of the component of a plurality of instances of the component, at least one feature of the instance that may vary among the plurality of instances is measured. Data that impacts the medical delivery using the instance of the component is determined based on a measurement of the at least one feature and in association with the instance of the component for use in medical delivery using the instance.

Aspects may include one or more of the following features.

One instance of the component of the plurality of instances is received, and the determined data that was stored in association with the one instance is retrieved. A medical delivery device id configured according to the retrieved data and the medical delivery is performed using the configured medical delivery device.

The medical delivery comprises drug delivery to a patient.

The instances of the component comprise instances of a drug cartridge.

At least one feature of the instance of a drug cartridge comprises a physical dimension of the instance that varies among the plurality of instances of the drug cartridges. For instance, the physical dimension comprises an orifice dimension of the drug cartridge.

An automatic injection device is configured according to the data that was stored in association with a drug cartridge. For instance, a drive mechanism is configured according to at least one of a force profile and a velocity profile to apply to the drug cartridge.

A drug is delivered according to the at least one of a force profile and a velocity profile.

In another aspect, in general, a method for medical delivery uses instances of a component that exhibits variation among the instances includes receiving one instance of the component. Data that was stored in association with the one instance is retrieved and a medical delivery device is configured according to the retrieved data. The medical delivery is performed using the configured medical delivery device.

Aspects may include one or more of the following features.

The medical delivery comprises drug delivery to a patient.

The one instance of the component comprises an instance of a drug cartridge.

The retrieved data includes at least one feature of the instance of a drug cartridge that varies among the plurality of instances of the drug cartridges.

The at least one feature comprises a physical dimension of the instance. For instance, the physical dimension comprises an orifice dimension of the drug cartridge.

The at least one feature comprises a quantity computer based a physical dimension of the instance.

An automatic injection device is configured according to the retrieved data. For example, configuring the automatic injection device comprises configuring a drive mechanism according to at least one of a force profile and a velocity profile to apply to the drug cartridge.

A drug is delivered according to the at least one of a forte profile and a velocity profile.

In another aspect, in general, an apparatus is for medical delivery using instances of a component that exhibits variation among instances of the component. The apparatus comprises a reader for retrieving data that was stored in association with an instance of the component, a controller for configuring the apparatus according to the retrieved data, and an actuator for performing the medical delivery using the configured medical delivery device and the instance of the component.

Aspects may include one or more of the following features.

The reader comprises at least one of a Radio Frequency Identification Device receiver and an optical barcode reader.

The reader is configured to retrieve the data from a tag affixed to the instance of the component.

The medical deliver comprises automated injection of a drug. For example, the injection of a drug comprises a needle-free injection of a drug.

Configuring the apparatus comprises configuring the at least one of a force profile and a velocity profile to apply via the actuator.

Other features and advantages of the invention are apparent from the following description, and from the claims.

DESCRIPTION

Figure 1:
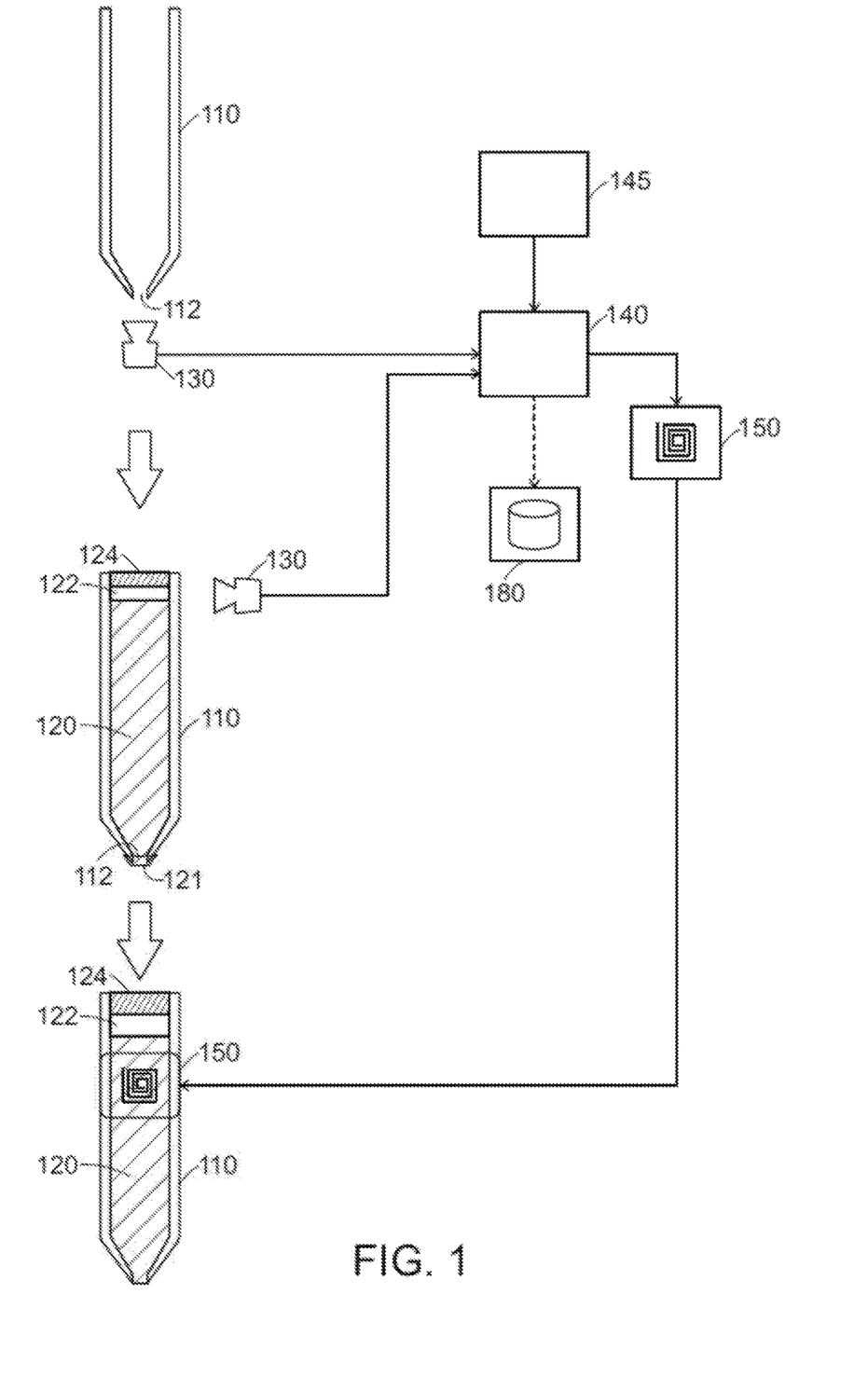
FIG. 1 is a schematic illustration of measurement and tagging of a drug cartridge.

Referring to FIG. 1, in an embodiment, a process of preparing a drug cartridge for an auto-injector is illustrated in three phases, which lead up to distribution of a filled cartridge for clinical use to deliver the drug to a patient. In a first phase, one or more features of an empty drug cartridge 110 are measured. In FIG. 1, a camera 130 is illustrated imaging an orifice 112 for the cartridge 110 to determine the diameter and/or area of the orifice. The camera 130 provides the measurements to a configuration controller 140, for example, implemented in software on a general-purpose computer. It should be understood that the orifice size is merely an example of a feature of the cartridge that may be measured, and that a camera is only one example of a sensor that may be used to measure the cartridge. More generally, any feature of interest may be measured using any suitable measurement sensor or combination of sensors.

The feature may, for example, include any feature that might vary from instance to instance in a device fabricated in a manufacturing process. The feature may also include any feature or property that affects performance of the injector (or other final device). Thus for example, mechanical properties (e.g., elasticity, thermal expansion, resonance, friction), optical properties (transparency, reflectivity), geometric properties (e.g., size, thickness, volume, diameter), and so forth may usefully be captured for individual instances of a system component. By way of non-limiting examples, the feature may include a bore diameter of an injection cartridge at one or more locations along the cartridge or a measured frictional force or coefficient of friction between the inside surface of the cartridge and a rubber plunger material that will be used to eject the drug during delivery. In general, the features of interest may be any features that exhibit manufacturing variation such that they are not entirely predictable from one manufactured unit to another, particularly where such features will affect the performance of the final device. By coupling a measurement on one hand with a detection of the feature during use on the other hand, a bar code or other tag that encodes the relevant measurement can advantageously improve the performance of the device during use, e.g., by increasing the accuracy of a drug dosage delivered by an injector, without imposing greater constraints on manufacturing tolerance.

The measurement system used to capture the measurement(s) may include any suitable, corresponding sensor system. For example, this may include a three-dimensional scanner for measuring object geometry. This may also or instead include a machine vision system or the like for automated visual inspection. In another aspect, light sources and cameras may be used to measure optical properties, scan for defects or irregularities, and so forth. The measurement system may also or instead use any suitable combination of hardware and/or software to measure, e.g., internal volume, weight, stiffness, porosity, and so forth.

Certain other features may not necessarily vary from cartridge to cartridge, and therefore may not need to be measured separately for each cartridge. However, the features may not be universal. Thus for example, where a cartridge is manufactured in a number of discrete sizes, e.g., three sizes or nozzle diameters, then the feature may be encoded with other cartridge information even where it is not a parameter measured by the measurement system described above. Thus, for example, designed features (as opposed to measured features) such as a nominal orifice diameter or a fabrication material, may also be encoded for a device and provided to a controller for use in configuration and operation of the device.

In another aspect, one or more features may not be measured on a cartridge-by-cartridge basis, but are rather assumed to be consistent (e.g., constant) within a manufacturing lot. For example, the identity of the drug to be filled may be provided by the manufacturing system. In this case the manufacturing system 145 may receive representative measurements, and provide predicted data for other cartridges of the same or similarly manufactured lots. In some examples, other features may be provided by the manufacturing system and/or may be dependent on manufacturing variation, for example, for the purpose of providing a way of determining the authenticity of the cartridge (e.g., using a Physical Uncloneable Function (PUP) of the cartridge, cryptographic security information, etc.).

In a second phase, the drug 120 to be delivered using the cartridge 110 is filled into the cartridge, the orifice 112 is sealed with a cap 121, and a plunger 124 is inserted into the bore of the cartridge. As illustrated in FIG. 1, the total amount of drug 120 in the cartridge and/or the amount of air 122 caught between the drug and the plunger 124 may vary from cartridge to cartridge as a result of variation in the filling process. In FIG. 1, another camera 130 is illustrated as providing measurements to the configuration controller 140 related to the result of the filling process. In this example, the amount of air 122 is described as a representative example of a measured feature, but is should be understood that other features may also or instead usefully be measured. For example, the measurement system may usefully measure a temperature of the drug at the time of filling, or a measured or known viscosity of the drug.

In a third phase, the configuration controller 140 prepares the data to be associated with the filled cartridge 110, and data representing the measured parameters and other information associated with the cartridge, is encoded onto a tag 150. This encoding may comprise the actual values of (or determined from) the measured features. In some implementations, the values may be stored in a database 180, and the encoding on the tag may include a reference to the values in the database, for example, using a Uniform Resource Identifier (URI).

In general, the tag 150 may be any device or combination of devices suitable for persistently encoding measured parameters, or pointers to measured parameters, for retrieval and use by a controller or the like. The tag 150 may, for example, include a radio frequency identifier tag, a near field communication tag, or other wirelessly readable tag. The tag 150 may also or instead include a bar code, a quick response code (QRC), or any other optically readable tag. The tag 150 may also or instead include an active wireless device or the like capable of independently transmitting measured parameters or related information to a controller for use in controlling an injection process or the like as contemplated herein. The tag 150 may be affixed to or otherwise associated with the cartridge 110 in any suitable manner. It should be understood that the use of a tag 150 attached to the cartridge 110 is only one way of transporting the data along with the cartridge. For example, other examples, include the cartridge itself having an integrated data storage, the cartridge having a preassigned identifier (e.g., using a bar code affixed during manufacturing) that is used to reference the data in the database 180, or the data being loaded directly into an injector device in the case that the cartridge is further loaded into the injector device at manufacturing time.

As described above with reference to FIG. 1, the measurement of the cartridge, and the encoding of the information onto a tag may be performed at any time during manufacturing. For example, the measurement may be performed after a cartridge is fully manufactured and filled with a drug for injection. In the alternative, some or all of the measurement and encoding may be done at an intermediate time between manufacturing and ultimate use. For example, the cartridges may be measured and encoded at a distribution center or at a hospital, and then passed on for ultimate use. Such an intermediate stage may be desirable, for example, because certain properties may change over time or as a result of transport and therefore the later measurement may provide higher accuracy. An example of such a property may relate to bubbles or dissolved gasses in a liquid, which may change as a result of temperature changes or physical movement during transport. In some embodiments, information may be encoded at multiple times during manufacture, deployment and use. For example, some information may be measured and encoded at the time and site or manufacture, e.g., by measuring critical cartridge dimensions such as cartridge interior volume or orifice diameter, any of which may usefully be measured, e.g., after injection molding, machining, or other processing steps. Other information may be usefully measured and encoded later, for example, by measuring dosage size or weight after a cartridge is filled with a drug, prepared for shipping to an end user, or received at a health care facility for use in patient care.

Figure 2:
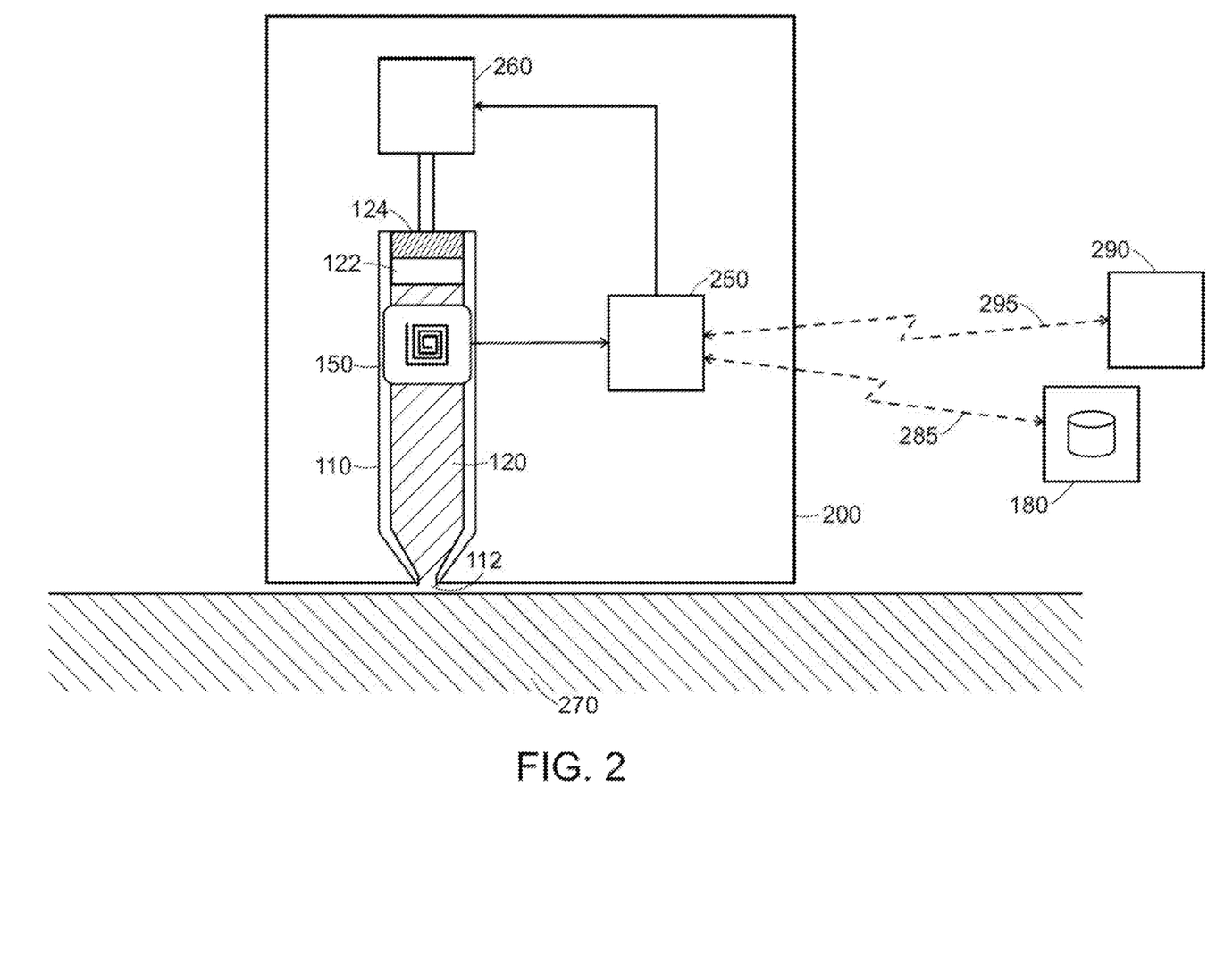
FIG. 2 is a schematic illustration of drug delivery using the cartridge of FIG. 1.

Referring to FIG. 2, at the time of drug delivery into tissue 270 of a patient, a delivery controller 250 in an injector 200 reads the data that was affixed to the cartridge and configures an injection driver 260 using the information. For example, the delivery controller 250 may include an RFID or barcode reader to retrieve data from the tag 150 on the cartridge 110. In examples where the tag 150 includes a reference to data or a universal identifier of the cartridge, the delivery controller may accesses a database 180, for example, over a wireless communication link 285, to retrieve the cartridge parameters or other information used by the controller 250 to configure or operate the injection driver 260. In some examples, the delivery controller communicates with a medical information system 290, for example, over a wireless communication link 295. For example, the delivery controller may confirm the authenticity of the cartridge (e.g., using a digital signature provided by a trusted party), confirm the orders for delivery to a particular patient, record the delivery to the patient, etc., via the medical information system 290.

As an example of configuration of the injection driver 260, the size of the air bubble 122, the size of the orifice 112, the fluid properties of the drug 120, and so forth, may be used to adjust the force and/or velocity profile applied to the plunger 124 by a motor of the injection driver 260 during an injection. More generally, any parameters useful for operating the injection driver 260 to more accurately control an injection process may be encoded on the tag 150 (or at a remote location such as the database 180 identified by the tag 150) and used during an injection as contemplated herein.

As an example, a particular drug may have a desired initial delivery velocity (e.g., 250 m/s), which may be encoded on the tag 150 based on the identity of that drug or based on measured fluid properties of the drug. Measurements and/or known parameters of the cartridge may include a bore diameter (e.g., 5.5 mm) and an orifice diameter (e.g., 0.150 mm), which may be used to determine the bore area (e.g., 23.8 mm$^2$) and the orifice area (e.g., 0.018 mm$^2$) (e.g., assuming that these sections are circular or substantially circular). For example, the bore diameter may be known with sufficient accuracy based on manufacturing specifications, while the orifice may be measured for each cartridge 110 to accommodate manufacturing variation. The desired initial jet velocity multiplied by the ratio of the orifice area to the bore area yields the desired plunger velocity (e.g., 186.0 mm/s) for achieving the targeted initial delivery velocity. In some embodiments, only the initial plunger velocity is encoded on the tag, while in other embodiments, the measured quantities that determine the plunger velocity are also encoded, and in some embodiments, the desired plunger velocity is not precomputed and rather is computed by the controller 250 or other processor at the time of injection based on parameters stored on the tag 150.

The description focuses on needle-free injectors. However, it will be understood that the techniques described herein may be usefully applied in other controlled-delivery contexts such as with needle-based auto-injectors or other drug delivery systems that would benefit from improved control using actual, measured parameters for a device. Similarly, it should be understood that measurement and encoding of a cartridge 110 for drug delivery is only an exemplary embodiment. The techniques described herein are not limited to needle-free or needle-based drug injection. Within the realm of drug delivery, the above-described technique may be used to characterize a needle that is affixed to a syringe rather than a cartridge or a syringe body itself. Furthermore, the approach of compensating for or mitigating the effect of manufacturing variation is not limited to characteristics of a drug cartridge. For example, characteristics of an injection mechanism itself may be measured and stored with the injection mechanism, such as electrical and/or force characteristics of a motor of an injection mechanism. In this way, motor-to-motor variation may be compensated for. Furthermore, calibration information may be recorded in this way later in the life of the injection mechanism, for example, to compensate for changes or degradation of the injection mechanism over time. The approach may be used for other devices, for example, drug infusion pumps, or devices that do not deliver drugs, for example, electrical stimulation devices (e.g., where an electrical probe to be attached to a subject is measured, and calibration information is encoded in a tag on the probe).

A tag for a cartridge as described above may also be used for device testing or the like. For example, information may be provided on a tag or other device affixed to or associated with a cartridge, and this information may be read by an injector or other apparatus to cause the apparatus to operate in a particular way (e.g., with a certain plunger velocity or force). In this embodiment, the cartridge is used for testing the apparatus, and may have integrated into it certain instrumentation, for example, sensors for force or velocity. Sensed information is then used to confirm that the apparatus is properly configured according to the information on the tag, thereby validating the control aspects of the apparatus. For example, if the information instructs the apparatus to achieve a certain plunger velocity, the sensed velocity can be validated according to whether it falls within a requisite tolerance of the instructed velocity.

More generally, a tag as contemplated herein may usefully store a wide range of information in addition to measured parameters for a cartridge. This may include dosing information for a drug contained in the cartridge, calibration information, general injection parameters, storage and temperature information (e.g., for tracking drug shelf life), and so forth. All such information may be used during shipping, storage, deployment and use of drug-containing cartridges as described herein.

The arrangement of the components illustrated above is provided by way of example and not limitation. The system may use other configurations of hardware and may include or exclude various sub-components all without departing from the scope of this disclosure. For example, a controller external to the injector may read the tag on the cartridge and determine the configuration for the delivery controller externally to the injector, and this configuration may then be provided to the injector. In some examples, this determination of the configuration may be performed using a computer in a remote server, for example, that is co-hosted with the database 180 or hosted in association with a medical information system.

The functions of the manufacturing controller and/or the delivery controller may be implemented in software, which is stored on a non-transitory machine-readable medium. Instructions in the software may be executed by a processor (e.g., in an embedded processor of an injection in the case of the delivery controller), and the execution may cause the controller to perform the steps, functions, calculations, and control operations described above.

Figure 3:
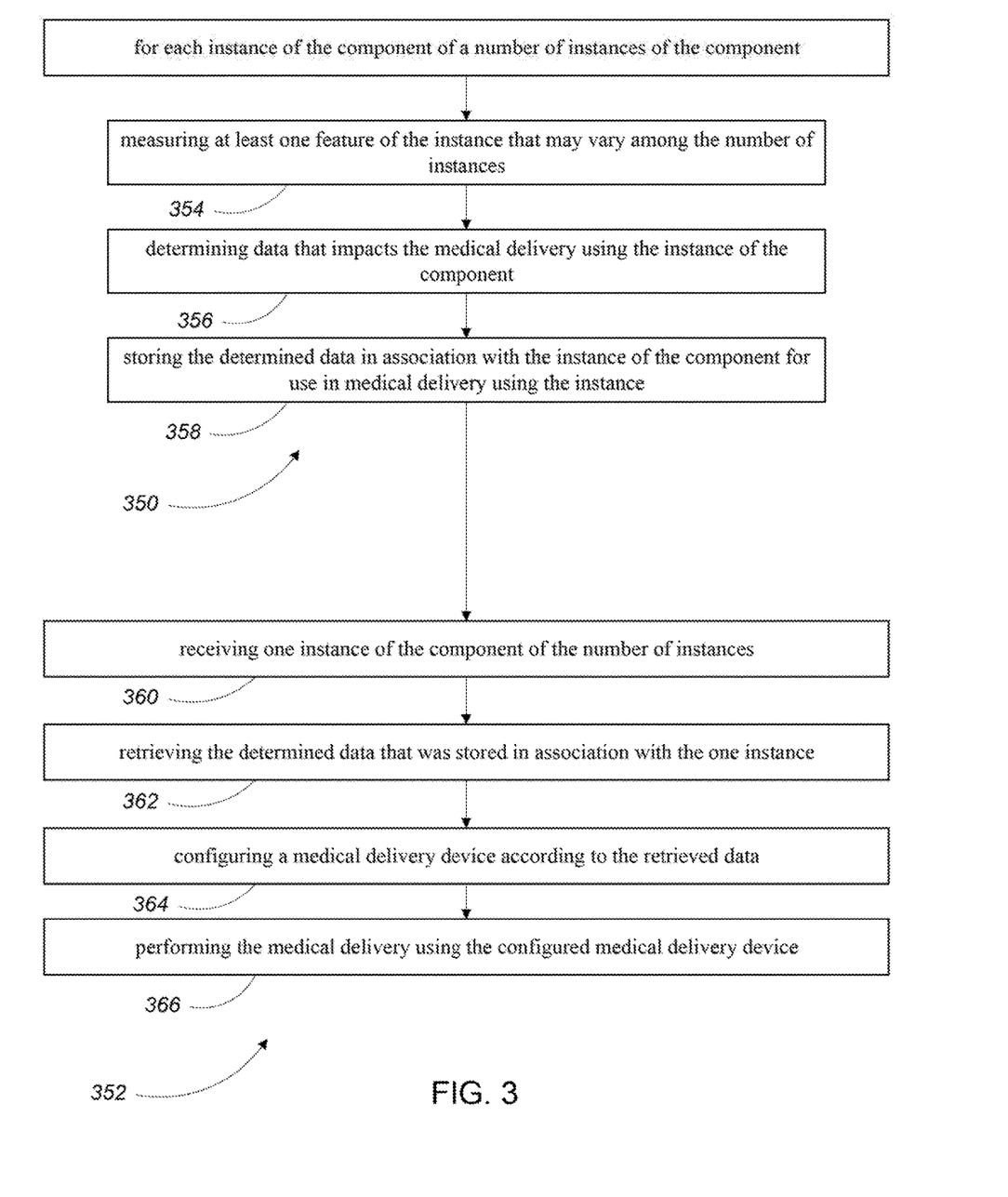
FIG. 3 is a flow chart of a first method for medical delivery using instances of a component that exhibits variation among the instances.

Referring to FIG. 3, a method for medical delivery using instances of a component that exhibits variation among the instances includes a provisioning phase 350 and an operational phase 352. In the provisioning phase 350, for each instance of a number of instances of the component, a first set of steps is performed. A first step 354 of the first set of steps includes measuring at least one feature of the instance that may vary among the number of instances. A second step 356 of the first set of steps includes determining data that impacts the medical delivery using the instance of the component. A third step 358 of the first set of steps includes storing the determined data in associate with the instance of the component for use in medical delivery using the instance.

The operational phase 356 includes performing a second set of steps. A first step 360 of the second set of steps includes receiving one instance of the component of the number of instances. A second step 362 of the second set of steps includes retrieving the determined data that was stored in associate with the one instance. A third step 364 of the second set of steps includes configuring a medical delivery device according to the retrieved data. A fourth step 366 of the second set of steps includes performing the medical delivery using the configured medical delivery device.

In some examples, the medical delivery includes drug delivery to a patient. In some examples, the instances of the component include instances of a drug cartridge. In some examples, the at least one feature of the instance of a drug cartridge includes a physical dimension of the instances that varies among the number of instances of the drug cartridges. In some examples, the physical dimension includes an orifice dimension of the drug cartridge. In some examples, the method includes configuring the automatic injection device according to the data that was stored in associate with the drug cartridge. In some examples, configuring the automatic injection device includes configuring a drive mechanism according to at least one of a force profile and a velocity profile to apply to the drug cartridge. In some examples, the method includes delivering a drug according to at least one of the force profile and the velocity profile.

Figure 4:
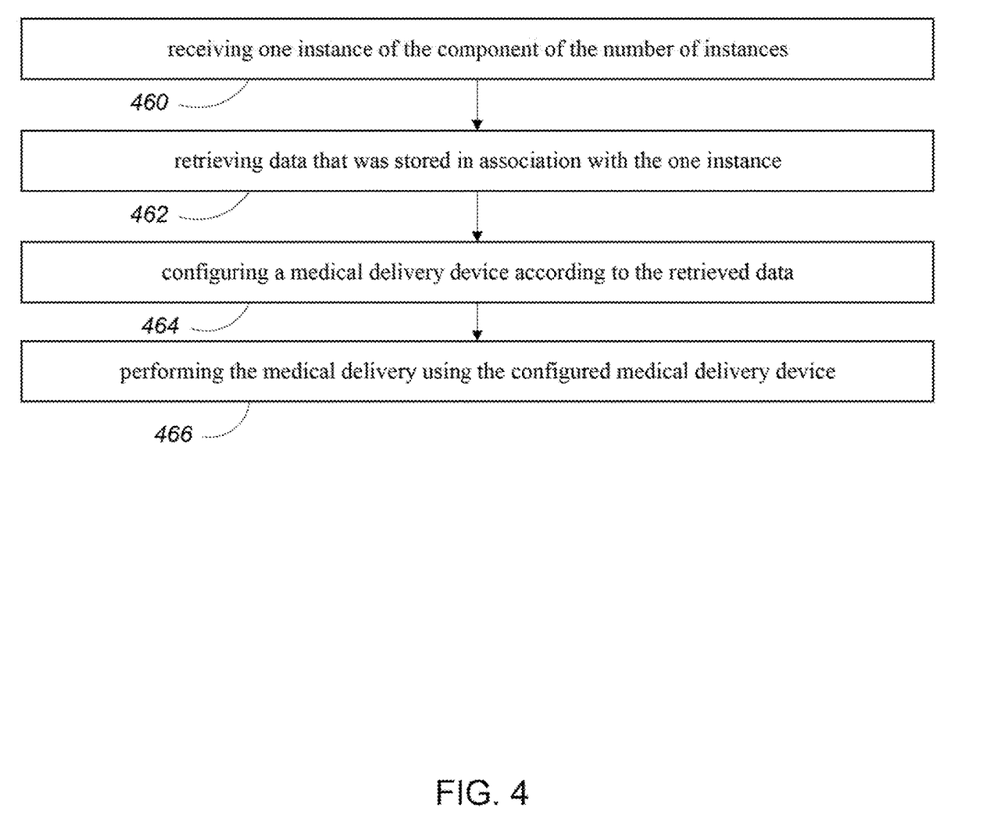
FIG. 4 is a flow chart of a second method for medical delivery using instances of a component that exhibits variation among the instances.

Referring to FIG. 4, a method for medical delivery using instances of a component that exhibits variation among the instances includes a set of steps. A first step 460 of the set of steps includes receiving one instance of the component of the number of instances. A second step 462 of the set of steps includes retrieving data that was stored in association with the one instance. A third step 464 of the set of steps includes configuring a medical delivery device according to the retrieved data. A fourth step 466 of the set of steps includes performing the medical delivery using the configured medical delivery device.

In some examples, the medical delivery includes drug delivery to a patient. In some examples, the instances of the component include an instance of a drug cartridge. In some examples, the at least one feature of the instance of a drug cartridge includes a physical dimension of the instances that varies among the number of instances of the drug cartridges. In some examples, the physical dimension includes an orifice dimension of the drug cartridge. In some examples, the at least one feature includes a quantity computed based on a physical dimension of the instance. In some examples, the method includes configuring the automatic injection device according to the retrieved data. In some examples, configuring the automatic injection device includes configuring a drive mechanism according to at least one of a force profile and a velocity profile to apply to the drug cartridge. In some examples, the method includes delivering a drug according to at least one of the force profile and the velocity profile.

Figure 5:
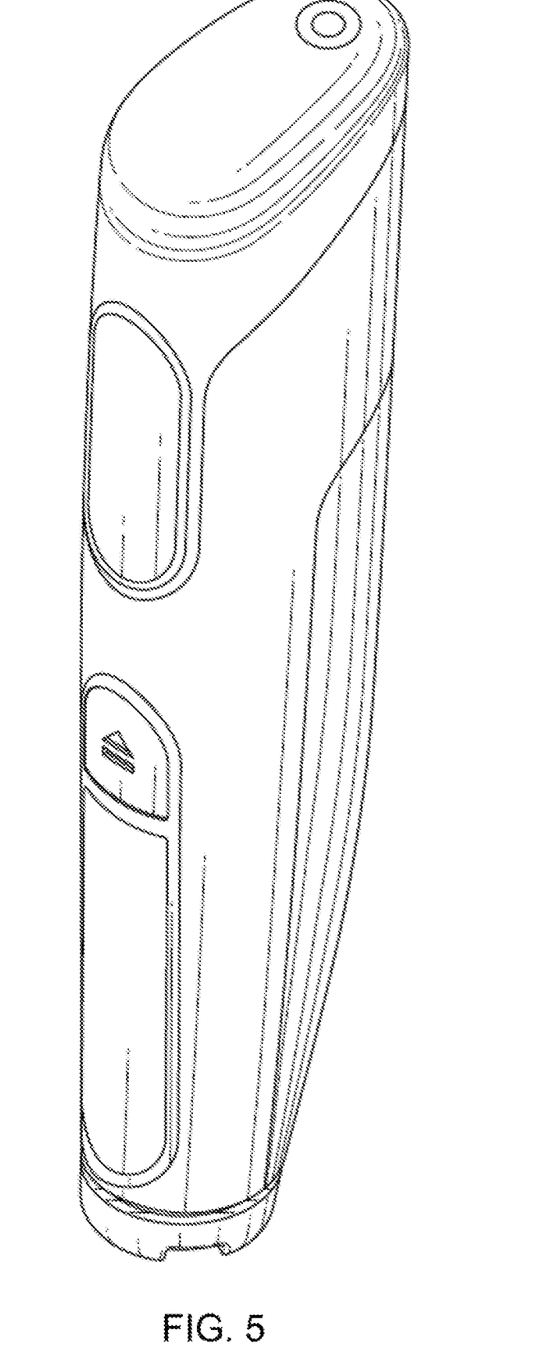
FIG. 5 is a perspective view of a needle-free injector that may be used with the systems and methods described herein.
Figure 6:
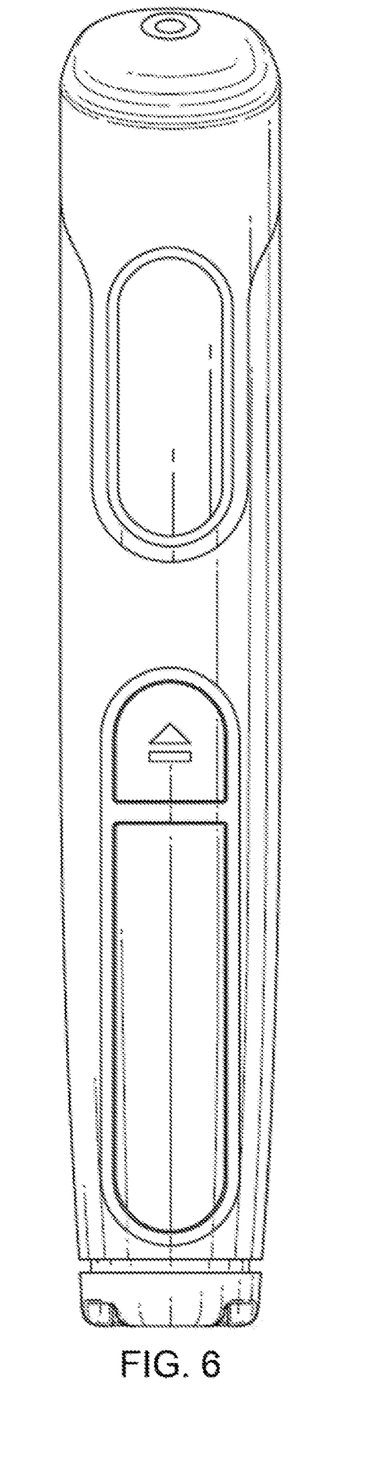
FIG. 6 is a front view of a needle-free injector.
Figure 7:
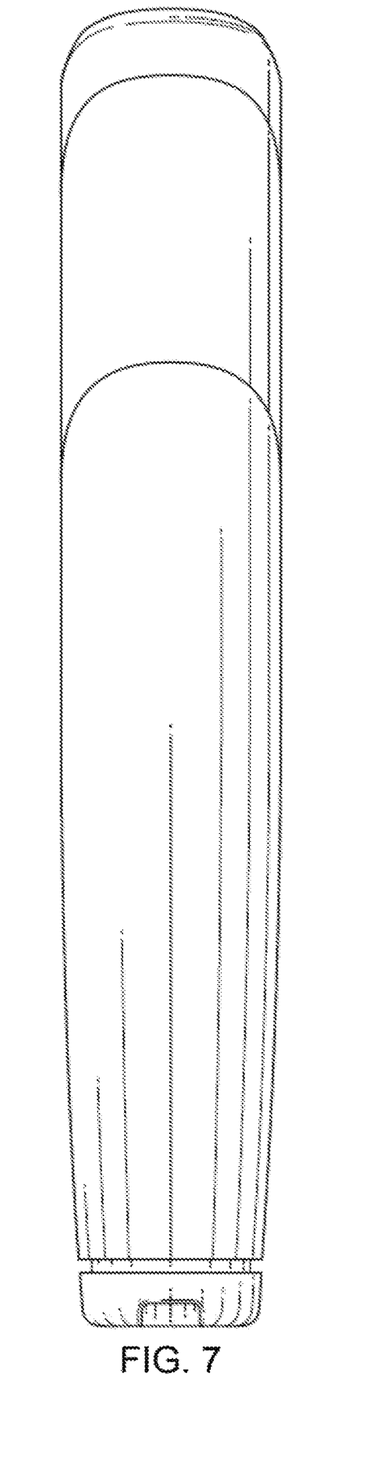
FIG. 7 is a rear view of a needle-free injector.
Figure 8:
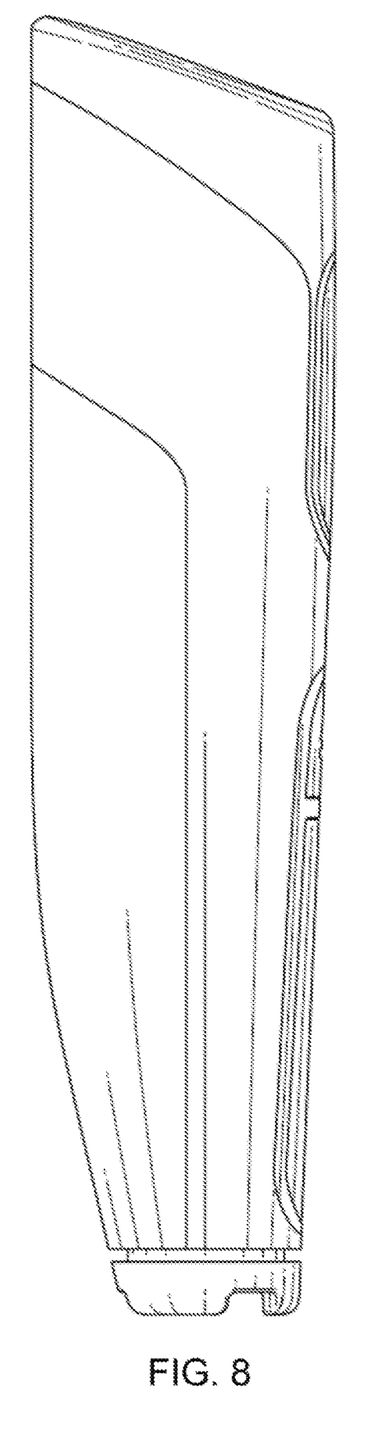
FIG. 8 is a left side view of a needle-free injector.
Figure 9:
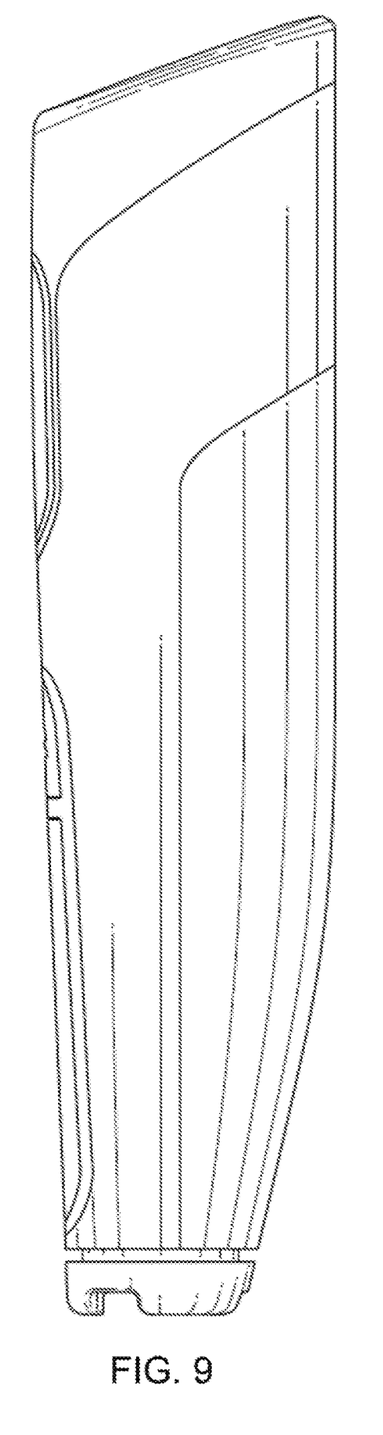
FIG. 9 is a right side view of a needle-free injector.
Figure 10:
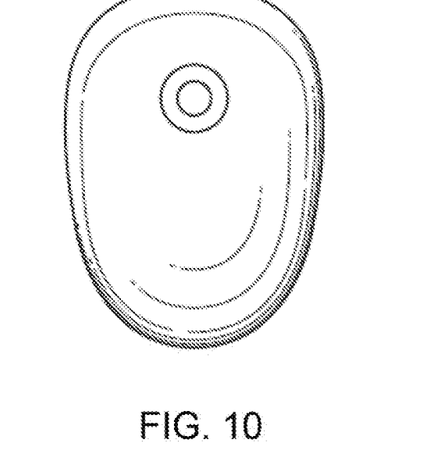
FIG. 10 is a top view of a needle-free injector.
Figure 11:
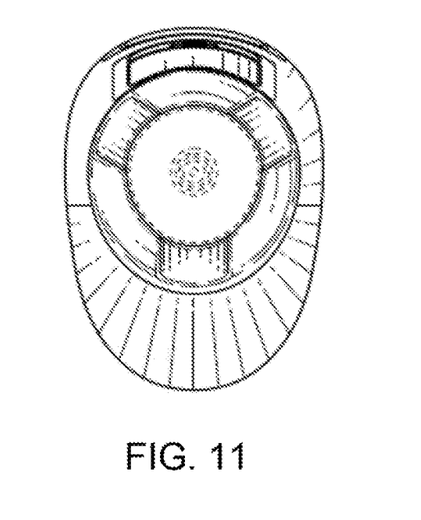
FIG. 11 is a bottom view of a needle-free injector.

FIG. 5 is a perspective view of a needle-free injector that may be used with the systems and methods described herein. FIG. 6 is a front view of a needle-free injector. FIG. 7 is a rear view of a needle-free injector. FIG. 8 is a left side view of a needle-free injector. FIG. 9 is a right side view of a needle-free injector. FIG. 10 is a top view of a needle-free injector. FIG. 11 is a bottom view of a needle-free injector.

It is to be understood that the foregoing description is intended to illustrate and not to limit the scope of the invention, which is defined by the scope of the appended claims. Other embodiments are within the scope of the following claims.

What is claimed is:

1. A method for needle-free medical delivery, the method comprising:
compensating for a characteristic of a cartridge of a needle-free injector system, thereby facilitating injection accuracy independently from manufacturing tolerance, wherein compensating for the characteristic comprises:
receiving a first cartridge, the first cartridge having been fabricated in a manufacturing process along with other cartridges, wherein, as a result of manufacturing variation during the manufacturing process, the first cartridge and the other cartridges all have different orifice diameters and the first cartridge and all the other cartridges, after having been filled with a drug, have different quantities of air trapped therein;
retrieving data from a memory of the first cartridge including a measurement of a diameter of an orifice of the first cartridge and a measurement of an amount of air trapped within the first cartridge with the drug;
configuring a needle-free medical-delivery device according to the retrieved data by computing a plunger velocity for a velocity of the drug from the orifice based on the measurement of the diameter of the orifice retrieved from the memory, and
using the configured needle-free medical-delivery device, performing a needle-free injection of the drug in the cartridge,
wherein performing the needle-free injection includes (a) controlling a force applied to a plunger in an open-loop manner according to the amount of air trapped within the first cartridge, and (b) controlling the velocity of the drug from the first cartridge based on the plunger velocity computed for the diameter of the orifice to provide an injection velocity as a function of time during the needle-free injection based on at least the diameter of the orifice.

2. The method of claim 1, wherein the medical delivery comprises drug delivery to a patient.

3. The method of claim 1, wherein the needle-free medical-delivery device is an automatic injection device and wherein configuring the automatic injection device comprises configuring a drive mechanism according to a force profile to apply to the first cartridge.

4. The method of claim 1, further comprising delivering a dose of drug according to a time-varying force profile that achieves a high velocity during an initial period to pierce the skin and then achieves a lower velocity after the initial period.

5. The method of claim 1, wherein the other cartridges comprise a second cartridge and wherein the method further comprising receiving the second cartridge, retrieving data that was stored in association with said second cartridge, said data having been obtained as a result of having measured the orifice diameter of the second cartridge and as a result of having measured the amount of air trapped within the second cartridge as a result of the second cartridge having been filled with the drug, configuring the needle-free medical-delivery device according to the data retrieved from the second cartridge, and using the needle-free medical delivery device to perform a needle-free injection of the drug that is in the second cartridge.

6. The method of claim 1, wherein the needle-free medical-delivery device is an automatic injection device and wherein configuring the automatic injection device comprises configuring a drive mechanism according to a velocity profile to apply to the first cartridge.

7. The method of claim 1, wherein the medical delivery comprises delivery of the drug into a patient's tissue.

8. A method for medical delivery, the method comprising:
receiving a cartridge for a needle-free injector, the cartridge being subject to a manufacturing variation in at least a diameter of an orifice of the cartridge and in an amount of air sealed in the cartridge upon having filled the cartridge with a drug, wherein the cartridge includes a tag that encodes information for retrieving the diameter and the amount of air;
using the tag with the needle-free injector to retrieve data that includes the diameter of the orifice and the amount of air, the data having been obtained as a result of a first measurement and a second measurement, wherein the first measurement is a measurement of the diameter of the orifice before having filled the cartridge with the drug and the second measurement is a measurement of the amount of air,
configuring the needle-free injector according to the retrieved data by computing a plunger velocity for a velocity of the drug from the orifice based on the first measurement of the diameter of the orifice, and
controlling a needle free injection for delivery of the drug from the cartridge by (a) controlling a force applied to a plunger in an open-loop manner according to the amount of air sealed in the cartridge, and (b) controlling the velocity of the drug from the cartridge based on the plunger velocity computed for the diameter of the orifice to provide an injection velocity as a function of time during the needle-free injection based on at least the diameter of the orifice.

9. The method of claim 8, wherein the tag is an RFID tag that stores the data.

10. The method of claim 8, wherein the tag specifies a Uniform Resource Identifier (URI) and the URI is used to retrieve the data.

11. A method for adjusting needle-free delivery of a drug, the method comprising:

receiving a cartridge configured for a needle-free injection of a drug, the cartridge fabricated in a manufacturing process subject to a manufacturing variation in a diameter of an orifice through which the drug will be delivered from the cartridge during the needle-free injection;

before adding the drug to the cartridge, measuring the diameter of the orifice;

after having added the drug to the cartridge and after having sealed the cartridge with a plunger, measuring an amount of air in the cartridge;

encoding information for retrieving both the diameter and the amount of air on a tag coupled to the cartridge;

retrieving the diameter and the amount of air based on the tag coupled to the cartridge;

configuring a needle-free injector for use with the cartridge by computing a plunger velocity for a velocity of the drug from the orifice based on the diameter of the orifice; and controlling a needle free injection for delivery of the drug from the cartridge by (a) controlling a force applied to the plunger in an open-loop manner according to the amount of air in the cartridge, and (b) controlling the velocity of the drug from the cartridge based on the plunger velocity computed for the diameter of the orifice to provide an injection velocity as a function of time during the needle-free injection based on at least the diameter of the orifice.

12. The method of claim 11, further comprising: placing the cartridge in the needle-free injector; reading the information from the tag; determining the diameter of the orifice based on the information; and adjusting operation of a motor of the needle-free injector to control a speed of the motor during delivery of the drug from the cartridge based on the diameter of the orifice.

* * * * *